United States Patent [19]

Sell

[11] Patent Number: 4,565,502
[45] Date of Patent: Jan. 21, 1986

[54] COUNTERBALANCE WHEEL FOR A WIND MACHINE

[76] Inventor: Otto Sell, 2201 E. Ash, Deming, N. Mex. 88030

[21] Appl. No.: 708,987

[22] Filed: Mar. 6, 1985

[51] Int. Cl.$^4$ ............................................. F04B 17/02
[52] U.S. Cl. ..................................... 417/334; 74/591
[58] Field of Search .................... 74/591, 36; 417/334; 416/170 A

[56] References Cited

U.S. PATENT DOCUMENTS 1,664,524  4/1928  Milz .................................... 74/591
4,507,060  3/1985  Sutz .................................... 74/591

Primary Examiner—Richard E. Gluck
Attorney, Agent, or Firm—Leonard Bloom

[57] ABSTRACT

A counterbalance wheel for a wind machine includes a wheel, a counterweight attached to the rim of the wheel, a cranking means for the wheel, and a frame constituting a support stand. By evenly distributing the loads imposed on the wind machine by a reciprocating pump, the counterbalance wheel is able to increase the efficiency of the wind machine.

10 Claims, 2 Drawing Figures

4,565,502

COUNTERBALANCE WHEEL FOR A WIND MACHINE

FIELD OF THE INVENTION

This invention relates to counterbalance wheels, and more particularly, to counterbalance wheels adapted to increase the efficiency of wind driven reciprocating pumps.

BACKGROUND OF THE INVENTION

A reciprocating wind machine usually has a gearbox provided with a suitable motion-translating mechanism for converting the rotary motion of a rotor or sail to the reciprocating motion of a suspended vertical shaft. A rigid frame supports the gearbox and rotor. The vertical reciprocating shaft transmits power from the gearbox to the driven device. The reciprocating wind machine may be used, for example, as a power source for a reciprocating pump.

The load required to operate a reciprocating pump is not uniform throughout the work cycle. The work cycle of a simple vertical reciprocating pump has two phases. In the first or working phase, power is required to lift the pump piston and the water to be delivered by the pump. In the second or return phase of the work cycle, less power is required because no pumping is being done and, also, because the weight of the piston contributes to the force required (if any) to restore the piston to the beginning of the cycle.

If a reciprocating pump imposes an instantaneous load which exceeds the capacity of the wind machine, the system will stall. A wind machine cannot utilize wind whose velocity is slower than the stall speed. The velocity of wind necessary to restart the wind machine is usually somewhat higher than the stall speed. This is because of the compound effects of static friction in the various components of the system.

Conventional wind driven reciprocating pumps are limited by their stall speeds. It is not uncommon for such a device to remain inactive for 30% of the time it is in service due to stalling. Various attempts have been made to lower the stall speed and restart speed, and thereby increase the usefulness of wind driven reciprocating pumps. The primary characteristic of these devices has been the process of redistributing peak loads encountered during one phase of the work cycle to less loaded portions of the work cycle. This usually entails generating potential energy during the return phase of the work cycle where the capacity of the wind machine is not usually utilized and releasing it during the working phase of the cycle where demand is at its highest.

Known in the prior art are systems of weights and pulleys designed to this effect. These have been unsatisfactory in practice and have fallen into disuse.

U.S. Pat. No. 3,782,222, issued Jan. 1, 1974, also deals with this problem. This patent illustrates the use of telescopic arms pivotally attached to the vertical reciprocating shaft. The arms are pivotally secured to rotatable discs carried by the windmill tower. A system of cables and counterweights cooperates with the adjustable telescopic arms to counterbalance the weight of the vertical shaft and pump cylinder. This system is limited by the difficulty of adjusting the two arms accurately and equally in the field and by the mechanical complexity of the assembly of parts, which is in itself a source of costly maintenance and down-time.

U.S. Pat. No. 4,211,126 describes a system for pushing and lifting loads having improved counterbalancing. This system replaces the telescopic arms and cables with two rigid arms carried pivotally by the windmill frame and pivotally attached to the reciprocating shaft.

The rigid arms carry adjustable weights. By moving the weights in the rigid arms, one is able to counterbalance, to some extent, the weight of the vertical shaft and pump piston. Like the '222 patent, this arrangement of pivoting parts is overly complex and carries four stressed pivot joints and two different counterweight adjustments.

Both of the prior art patents are also limited by their structure to delivering reciprocating motion. This form of driving force is suitable for some commonly used driven machines such as reciprocating water pumps and air compressors, but cannot be used on rotating machines such as alternators, generators, or rotary pumps without extensive modification.

SUMMARY OF THE INVENTION

It is an object of the present invention to provide an improved counterweight for a wind machine which is mechanically simple, not complicated, economical to produce, easy to adjust in the field, reliable, and provide a longer, useful lifetime than the known art.

It is a further object of the present invention to provide an improved counterweight for a wind machine that is capable of generating reciprocating power, or rotary power, or both.

In carrying out the above objects, the improved counterbalance includes a counterweighted wheel journaled in a frame. A frame supports the axle of the wheel, preferably in a horizontal position. The axle carries a hub and is provided with spokes connected to a rim. A weight is removably attached to the rim. An eccentric coupling means transmits the reciprocating motion of a wind machine's vertical shaft to the hub of the wheel, thereby rotating the wheel. Means are provided to pivotally link the coupling means to a second vertical shaft. The reciprocating motion of the second vertical shaft is used to drive a machine such as a reciprocating pump. The rotary motion of the wheel rim may be used to drive a rotating machine such as a generator. The counterweight on the rim is used to counterbalance the weight of the vertical shafting and pump piston so as to increase the efficiency of the wind driven system.

The objects, features, and advantages of the present invention are readily apparent from the following detailed description of the preferred embodiment when taken in connection with the accompanying drawings.

BRIEF DESCRIPTION OF THE DRAWINGS

With reference to FIG. 1, the present invention finds particular utility with a windmill 10 (or other wind machine). The windmill is provided with a frame 11, one or more vanes or sails 12 constituting the rotor, and a gearbox 13. The gearbox may be provided with a motion-transmitting mechanism which, being conventional, has been omitted for ease of illustration. the mechanism drives a reciprocating driving shaft 14. The shaft 14 may be adapted for driving a suitable reciprocating load, such as a piston pump 15, via a driven shaft 16. The pump may constitute a vertical reciprocating fluid piston pump useful, for example, in pumping water on a farm.

Figure 1:
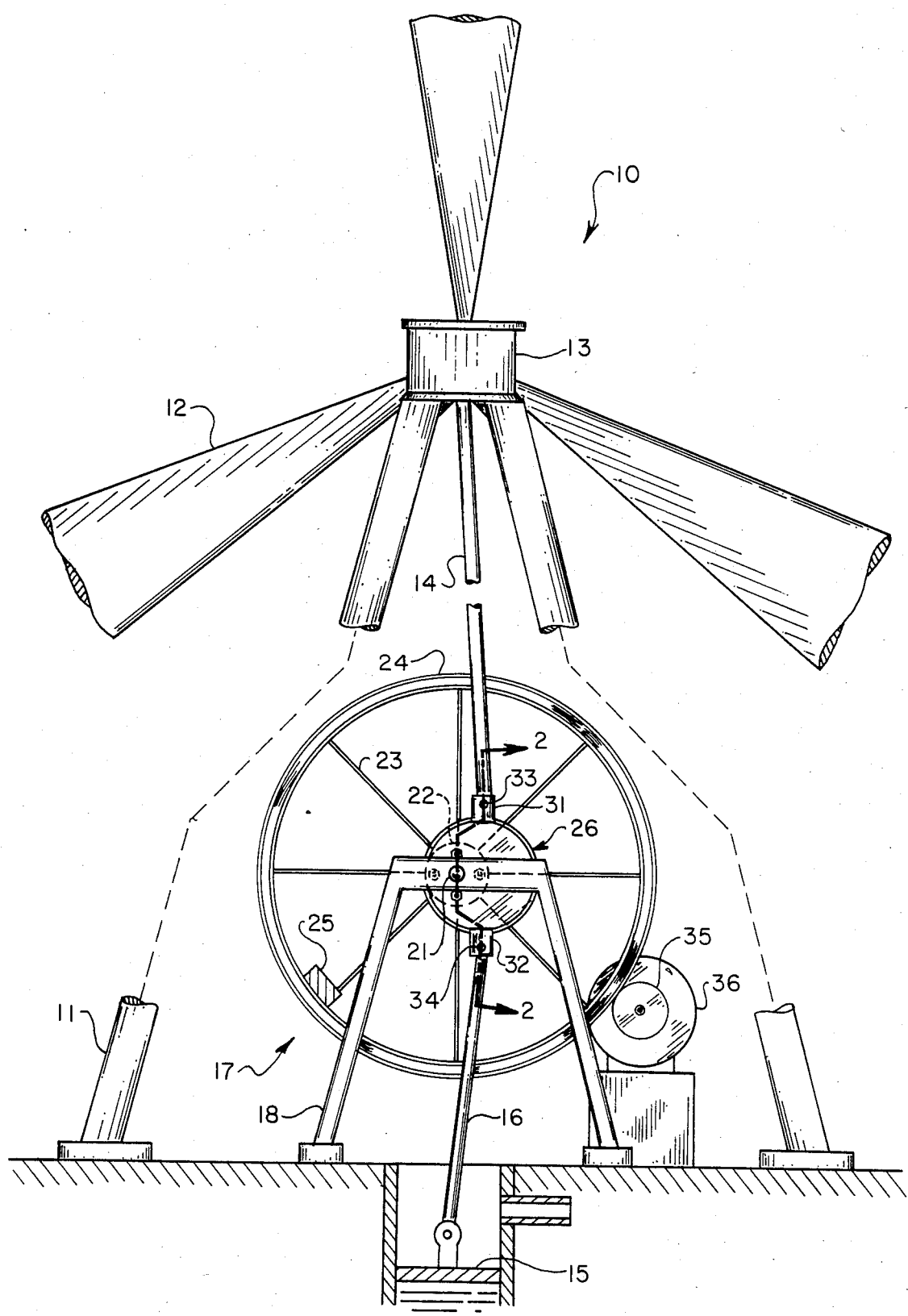
FIG. 1 is a plan view of the counterbalance wheel adapted to a wind machine driving a vertical fluid piston pump through a vertical reciprocating shaft, and showing a power generator impinging on and being driven by the counterbalance wheel rim.
Figure 2:
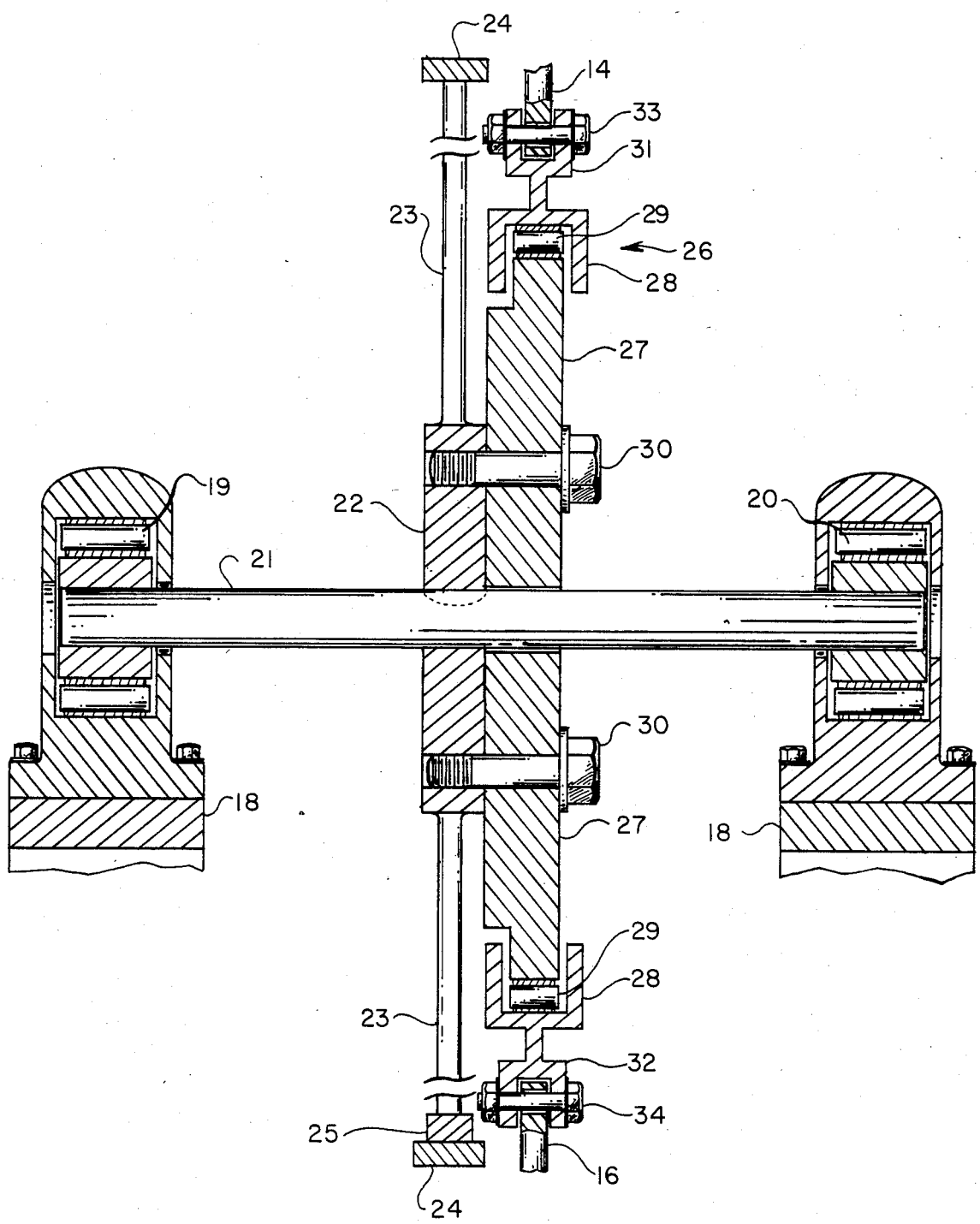
FIG. 2 is a section view through lines 2—2 of FIG. 1, drawn to an enlarged scale, and showing the coupling means attached to the axle by means of a hub. The axle supports a counterweighted wheel and is rotatably journaled transversely to the reciprocating vertical shaft within a rigid frame.

With reference again to FIG. 1, and with further reference to FIG. 2, the improved counterbalanced wheel means of the present invention is denoted generally at 17. This means 17 includes a rigid frame 18 provided with bearings 19 and 20 for journaling an axle 21 disposed transversely of the driving and driven vertical shafts. Preferably, the driving and driven reciprocating shafts are disposed vertically, and the axle is disposed horizontally as shown in the drawings. The axle has a hub 22 keyed thereto for rotation in unison, and the hub has a plurality of radially projecting spokes 23 connected to a wheel rim 24. The rim carries a suitable counterweight 25. Preferably, the counterweight is removably mounted on the wheel and may be replaced with alternate counterweights, either heavier or lighter, so as to counterbalance various loading conditions imposed by the driven load.

A bearing means 26 is carried on the hub, laterally thereof and eccentrically thereto, and provides a coupling between the reciprocating shafts 14 and 16. The bearing means 26 includes an inner race 27, an outer race 28, and rollers 29 (or other suitable anti-friction elements) therebetween. The inner race of the bearing means is secured to the hub, eccentrically to the axis of the rotating axle, by bolts 30 (or other suitable means). The outer race of the bearing means has diametrically-opposed bifurcated forks 31 and 32, respectively. Fork 31 straddles the driving shaft 14 and is pivotably connected thereto by a transverse pin 33. Fork 32 straddles the driven shaft 16 and is pivotably connected thereto by a transverse pin 34.

Additionally, and as shown in FIG. 1, the rim of the wheel may engage a friction disc 35 (or other suitable means) for driving a rotary load 36 simultaneously with driving the pump 15.

In operation, the working cycle of the system has two distinct phases. In a conventional reciprocating wind machine, useful work (for example, the lifting of water from a well) is accomplished only during the upward movement of the first or driving shaft 14. During the descent of the driving shaft 14, the system is generally idle. In accordance with the teachings of the present invention, each 360 degree rotation of the wheel corresponds to a full working cycle. The counterweight 25 is located on the rim of the wheel such that during the 180° of operation during which the water is being lifted from the well, the counterweight is falling under the influence of gravity. The force contributed by the counterweight is transmitted to the respective vertical shafts 14 and 16 via the bearing (coupling) means 26 and is sufficient to substantially counterbalance the weight of the driving shaft 14, the driven shaft 16, the weight of the reciprocating parts of the fluid pump, and half the weight of the water delivered during each working cycle of the reciprocating pump, thereby evenly distributing the work load over the entire work cycle. In this way, the work performed by the driving shaft 14 is equal to half the work necessary to lift only the water. During the remainder of the work cycle, which would normally be on idle phase, the counterweight 25 must be lifted against the force of gravity. Because of the downward movement of the pump piston under its own weight, the driving shaft 14 must perform in the downward stroke work equal to half that amount necessary to lift only the water lifted during one work cycle. Accordingly, the work cycle of the conventional reciprocating wind machine which comprises a lifting phase and an idle phase has been transformed to a cycle in which half the work is accomplished during each phase. As has been stated, the effect of such a distribution of forces is to increase the reliability of the machine and allow it to function in slower winds, thereby making the device more efficient.

While the best mode for carrying out the invention has been described, it will be appreciated by those skilled in the art that various alternative designs and embodiments may be practiced without departing from the basic spirit and teachings of the present invention. Accordingly, within the scope of the appended claims, the invention may be practiced other than specifically disclosed herein.

I claim:

1. In combination with a wind-driven apparatus having a driving reciprocating shaft adapted to drive a reciprocatory load, a counterbalancing means for the shaft and load, comprising a frame, an axle journaled in the frame transversely of the reciprocating shaft, coupling means between the shaft and the load, the coupling means having an inner portion, an outer portion, and a rotary bearing means therebetween, the inner portion having an opening formed therein, eccentrically thereof, for receiving the axle, means for pivotably mounting the outer portion of the coupling means to the driving shaft and to the load, respectively, at substantially opposite positions on the outer portion of the coupling means, a wheel carried by the axle and having a hub disposed laterally of the coupling means, means for securing the wheel hub to the inner portion of the coupling means, and means on the wheel for counterbalancing the reciprocating shaft and load.

2. The combination of claim 1, wherein the driven reciprocatory load comprises a vertical reciprocating fluid piston pump for pumping water.

3. The combination of claim 2, wherein the piston pump has a reciprocating vertical driven shaft pivotably mounted on the outer portion of the coupling means.

4. The combination of claim 3, wherein the wheel has a rim, and wherein the counterbalance means comprises a counterweight removably mounted on the wheel rim.

5. The combination of claim 4, wherein the weight of the counterweight is sufficient to counterbalance the weight of the driving and driven vertical shafts, the weight of the reciprocating parts of the fluid pump, and one half the weight of water delivered during each working cycle of the reciprocating pump, thereby evenly distributing the work load over the entire work cycle.

6. The device of claim 4, wherein the counterweight is removable from the rim and replaceable with alternate counterweights, either heavier or lighter, so as to counterbalance various loading conditions imposed by the load.

7. The combination of claim 1, wherein the coupling means comprises a bearing means having an inner race, an outer race, and anti-friction elements therebetween.

8. The combination of claim 1, wherein the load includes a driven shaft pivotably connected to the outer portion of the coupling means, and wherein the means for pivotably mounting the outer portion of the coupling means to the respective driving and driven shafts comprises respective bifurcated forks straddling the respective shafts, and a pin transverse of each fork and shaft.

9. The combination of claim 1, wherein the wheel has a rim, and wherein a friction disc engages the wheel rim for driving a rotary load.

10. In combination with a wind-driven apparatus having a vertical driving reciprocating shaft adapted to drive a pump having a reciprocating piston for pumping water, wherein the pump has a vertical driven reciprocating shaft, a counterbalance means for the driving and driven shafts as well as the weight of the reciprocating piston and half the weight of the water delivered during each working cycle of the pump, thereby evenly distributing the work load over the entire work cycle, said counterbalancing means comprising a frame, a horizontal axle journaled in the frame, a wheel on the axle, the wheel having a rim and further having a plurality of spokes disposed radially between the rim and the axle, a removable counterweight on the wheel rim, a hub on the axle and keyed thereto for rotation in unison, an inner bearing race carried eccentrically on the hub, an outer bearing race, a plurality of anti-friction elements between the inner and outer races, means for pivotably mounting the driving shaft on the outer race, and means for pivotably mounting the driven shaft on the outer race substantially diametrically opposite to the pivotable mounting of the driving shaft.

* * * * *